United States Patent
Shen

(10) Patent No.: US 11,727,081 B2
(45) Date of Patent: *Aug. 15, 2023

(54) SYSTEM AND METHOD OF PRESENTATION OF ONLINE FINANCIAL REPORT

(71) Applicant: HITHINK FINANCIAL SERVICES INC., Chicago, IL (US)

(72) Inventor: Mingxiang Shen, Hangzhou (CN)

(73) Assignee: HITHINK FINANCIAL SERVICES INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,133

(22) Filed: Sep. 26, 2022

(65) Prior Publication Data

US 2023/0012659 A1     Jan. 19, 2023

Related U.S. Application Data

(63) Continuation of application No. 16/336,536, filed as application No. PCT/CN2016/100183 on Sep. 26, 2016, now Pat. No. 11,481,465.

(51) Int. Cl.
*G06F 17/00* (2019.01)
*G06F 16/957* (2019.01)
(Continued)

(52) U.S. Cl.
CPC ........ *G06F 16/9577* (2019.01); *G06F 16/254* (2019.01); *G06F 16/986* (2019.01); *G06F 40/106* (2020.01); *G06Q 40/02* (2013.01)

(58) Field of Classification Search
CPC .. G06F 16/9577; G06F 16/986; G06F 16/254; G06F 40/106; G06Q 40/02
See application file for complete search history.

(56) References Cited

U.S. PATENT DOCUMENTS 7,949,937 B2    5/2011   Wu
8,140,431 B1    3/2012   Murphy
(Continued)

FOREIGN PATENT DOCUMENTS

CN       1464439 A    12/2003
CN    101615177 A    12/2009
(Continued)

OTHER PUBLICATIONS

International Search Report in PCT/CN2016/100183 dated Jul. 10, 2017, 8 pages.
Pit Data, JSON of report data source, 2015, 21 pages.

*Primary Examiner* — Mohammed H Zuberi
(74) *Attorney, Agent, or Firm* — Metis IP LLC

(57) ABSTRACT

The present disclosure relates to a statement presentation system. The statement presentation system may include a computer-readable storage medium that may be configured to store executable modules. The computer-readable storage medium may include a statement browser that may be configured to receive a statement file and present a statement. The computer-readable storage medium may also include a statement generation engine that may be configured to modify the statement file, and generate a modified statement file. The statement generation engine may extract data from a data source based on the modified statement file, and operate the extracted data. The operation may be conducted by loadable operation code, a loadable operation library file, or a loadable operation tool. The statement generation engine may render the operated data and display the rendered data on the statement browser in the form of a statement.

19 Claims, 12 Drawing Sheets

(51) Int. Cl.
   *G06F 16/958*   (2019.01)
   *G06F 16/25*    (2019.01)
   *G06F 40/106*   (2020.01)
   *G06Q 40/02*    (2023.01)

(56) References Cited

U.S. PATENT DOCUMENTS

| | | |
|---|---|---|
| 9,424,333 B1 | 8/2016 | Bisignani et al. |
| 9,697,524 B1 | 7/2017 | Fischer et al. |
| 2009/0099999 A1 | 4/2009 | Warren |
| 2010/0100802 A1 | 4/2010 | Delaporte et al. |
| 2011/0302221 A1 | 12/2011 | Tobin et al. |
| 2013/0166497 A1 | 6/2013 | Schroetel et al. |
| 2014/0250375 A1 | 9/2014 | Malik |
| 2016/0147903 A1 | 5/2016 | Wang |

FOREIGN PATENT DOCUMENTS

| | | |
|---|---|---|
| CN | 102467494 A | 5/2012 |
| CN | 102866985 A | 1/2013 |
| CN | 103530394 A | 1/2014 |
| CN | 103646016 A | 3/2014 |
| CN | 104281447 A | 1/2015 |
| CN | 104636393 A | 5/2015 |
| CN | 105260476 A | 1/2016 |
| CN | 105760370 A | 7/2016 |

SYSTEM AND METHOD OF PRESENTATION OF ONLINE FINANCIAL REPORT

CROSS-REFERENCE TO RELATED APPLICATIONS

This application is a continuation application of U.S. patent application Ser. No. 16/336,536, filed on Mar. 26, 2019, which is a U.S. national stage under 35 U.S.C. § 371 of International Application No. PCT/CN2016/100183, filed on Sep. 26, 2016, designating the United States of America, the entire contents of each of which are hereby incorporated by reference.

TECHNICAL FIELD

The present disclosure generally relates to a system and method for presenting statements (also referred to as online financial reports), and more particularly, to a system and method for presenting statements using user-defined interfaces.

BACKGROUND

As a way of data presentation, statements are used in various types of software, such as financial software, accounting software, tax software, and banking professional software, etc. Statements may be presented offline or online. The online presentation of statements is used for data sharing among communities, groups, enterprises, companies, departments, and users. Data presented in the statements may be obtained from various sources.

Existing methods for presenting online statements are mostly fixed (e.g., presenting a fixed statement). Accordingly, the data presented in the statement are not flexible. For example, sometimes certain data are not required by a user, but the user cannot change or delete them because of the fixed format, and they cannot change or add data they need as well. At the same time, the presentation methods of data are fixed. For example, the data can only be presented to a user in a predetermined format, while the user may want a more dynamic or flexible method of data presentation, such as by adding histograms, sector diagrams, animations, or videos, or the like. In addition, the data sources of the data presented in the online statement are also fixed. At present, the data sources provided by the application providers are normally default data sources. And the user may want a user-defined way of statement presentation to define the data source of the statements themselves. Therefore, it is necessary to develop a system and method of statement presentation, in which data items may be added or deleted flexibly, data presentation methods may be changed, and data sources may be more flexible and diverse.

SUMMARY

The present disclosure relates to a statement presentation system. The statement presentation system may include a computer-readable storage medium, which may be configured to store executable modules. The computer-readable storage medium may include a statement browser, which may be configured to receive a statement file and present a statement. The computer-readable storage medium may also include a statement generation engine, which may be configured to modify the statement file, and generate a modified statement file. The statement generation engine may extract data from a data source based on the modified statement file, and operate the extracted data, wherein the operation may be conducted by loadable operation code, a loadable operation library file, or a loadable operation tool. The statement generation engine may render the operated data; and display the rendered data on the statement browser in the form of a statement.

In the statement presentation system disclosed in the present disclosure, the statement file may be in a language format of XML, and the statement file may include an LUA language script.

In the statement presentation system disclosed in the present disclosure, the modification to the statement file may include modifying an interface of a layout file in the statement file, modifying a data source address in the statement file, and modifying a data operation formula of the statement file.

In the statement presentation system disclosed by the present disclosure, the extraction of data may include extracting local data and extracting remote data. The local data may include data of a local database or data of a user-defined database. The remote data may include data obtained from a network. The data obtained from the network may include data obtained from an Internet webpage.

The present disclosure also discloses an online statement presentation method. The method may include receiving a statement file, modifying the statement file and generating a modified statement file, extracting data from a data source based on the modified statement file, operating the extracted data, wherein the operation is conducted by loadable operation code, a loadable operation library file, or a loadable operation tool, rendering the operated data, and displaying the rendered data in the form of a statement.

In the online statement presentation method disclosed in the present disclosure, the statement file may be in a language format of XML, and the statement file may include an LUA language script.

In the online statement presentation method disclosed in the present disclosure, the modification to the statement file may include modifying an interface of a layout file in the statement file, modifying a data source address in the statement file, and modifying a data operation formula of the statement file.

In the online statement presentation method disclosed in the present disclosure, the extraction of data may include extracting local data and extracting remote data. The local data may include data of a local database or data of a user-defined database. The remote data may include data obtained from a network. The data obtained from the network may include data obtained from an Internet webpage.

BRIEF DESCRIPTION OF THE DRAWINGS

The present disclosure is further described in terms of exemplary embodiments. The technical solutions of the embodiments are described in detail with reference to the drawings. The drawings are not to scale. The embodiments are non-limiting exemplary embodiments, in which like reference numerals represent similar structure and operation unless stated otherwise or obvious from the context. Those having ordinary skills in the art, without creative efforts, may apply the present disclosure to other similar scenarios according to these drawings.

DETAILED DESCRIPTION

Figure 1:
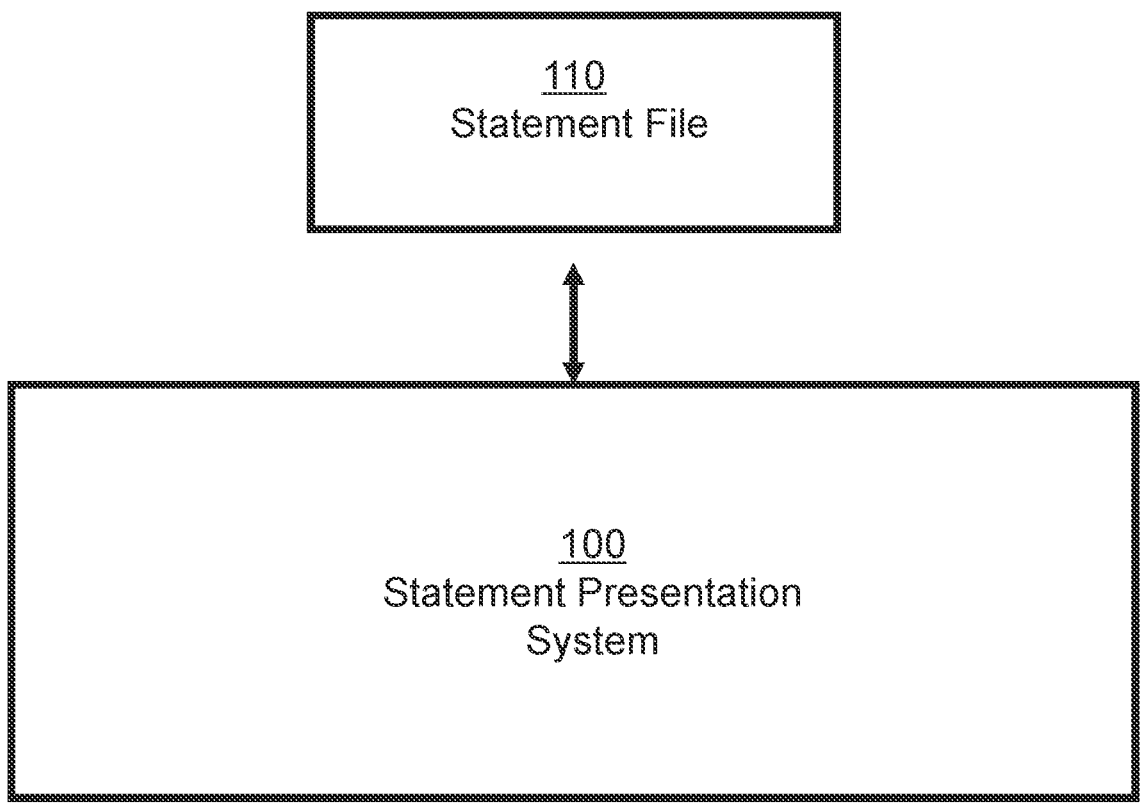
FIG. 1 is an exemplary diagram illustrating a system of statement presentation.

As used in the disclosure and the appended claims, the singular forms "a," "an," and "the" include plural referents unless the contents clearly dictates otherwise. It will be further understood that the terms "comprises," "comprising," "includes," and/or "including" when used in the disclosure, specify the presence of stated steps and elements, but do not preclude the presence or addition of one or more other steps and elements.

As a way of data presentation, statements are used in various types of software, such as financial software, accounting software, tax software, and banking professional software, etc. Statements may be presented offline or online. Online presentation of statements is used for data sharing among enterprises, companies, communities, departments, groups, and users.

The systems and methods for statement presentation disclosed in the present disclosure may collect local data or remote data, operate and process the collected data by calling local or external tool, and present the operated and processed data. The present disclosure provides a method for modifying statement presentation interface used in the system for presentation.

Different embodiments of the present disclosure may be applied to various fields, including but not limited to financial and derivatives investment (including stock, bond, gold, paper gold, silver, foreign exchange, precious metal, futures, money fund, etc.), technology (including mathematics, physics, chemistry and chemical engineering, biology and biological engineering, electronic engineering, communication system, Internet, Internet of Things, etc.), politics (including politician, political event, country, etc.), news (in terms of regions, including local news, national news, and international news; in terms of subjects, including political news, technological news, economic news, social news, meteorological news, etc.). The application scenarios of different embodiments of the present disclosure may include a webpage, client, custom-built system, internal analysis system of an enterprise, or any combination thereof. The above description of the fields of application is merely a particular example, and should not be understood as the only embodiment. Obviously, those skilled in the art, after understanding the basic principles of the statement presentation method and system, may modify or vary the form and details of the application fields of the method and system without departing from the principles. The modifications and variations are still within the scope of the current disclosure described above.

Different kinds of data sources may be applied to different embodiments of the present disclosure where applicable. The data sources may include internal data sources and external data sources. The internal data sources may include local database management systems (DBMS) and local storage mediums. The external data sources may include data sources obtained via a network, such as data sources obtained via Wide Area Network (WAN), or data sources obtained via the Internet. In some embodiments, a user may obtain corresponding data from a specific website of the Internet. Moreover, the external data sources may also include some DBMSs that transmit and process data via a network. For example, XML database may be one kind of external data sources.

The various embodiments of the present disclosure may support direct processing or third-party processing of the various data extracted by a statement. For example, the various embodiments of the present disclosure may access to a third-party program such as a language and programming tool, including C, C++, Java, Matlab, Python, R, VBA, etc. By providing calling interfaces for the third-party program, the system may conduct diverse and quantified processing and operation of the statement data.

The various embodiments of the present disclosure may support a flexible presentation of the data provided and processed by the statements. For example, the various embodiments of the present disclosure may support automatic or manual modifications to the presentation methods of the statement interface. In some embodiments, data presentation may be defined and described by a layout file. Through automatic or manual modification to the layout file, the system may redefine or adjust the overall layout, the presentation format, and the related data contents, etc.

The various embodiments of the present disclosure may support a real-time change of the statement data. In other words, the system may present the data, including the data of the original statements and the data after an operation, in real time and in a way defined by the layout file. For example, the stock data of an original statement file, such as stock prices, volumes of trade, or stock-related index data, may be presented in the interface in real time and in a way defined by the layout file.

The present disclosure is further described in terms of exemplary embodiments. The technical solutions of the embodiments are described in detail with reference to the drawings. The drawings are not to scale. The embodiments are non-limiting exemplary embodiments, in which like reference numerals represent similar structure and operation unless stated otherwise or obvious from the context. Those having ordinary skills in the art, without creative efforts, may apply the present disclosure to other similar scenarios according to these drawings.

FIG. 1 is an exemplary diagram illustrating a statement presentation system. A statement presentation system 100 may be configured to input and/or modify a statement file 110. For example, an edit box may be configured in the statement presentation system 100 for editing the statement file 110. Some attributes of the statement file 110 may be modified in the edit box. The statement presentation system 100 may be configured to extract, process, and present data of the statement file 110. The statement presentation system 100 may extract data related to a statement from the statement file 110, operate and process the data, and present the data in the form of a statement.

The statement 110 may include one or more layout files. In some embodiments, the layout files may be used to illustrate or specify extraction methods of the statement data. For example, the layout file may be used to illustrate or specify a source of the statement data by designating a data source 230 of the statement presentation system 100 (shown in FIG. 2) as the source of the statement data.

In some embodiments, the layout files may be used to illustrate the operation and processing method of the statement data. For example, the layout file may set the method of calling the third-party program interface, or call the executable program or library file programmed by a third-party program to process the data.

In some embodiments, the layout file may also be used to illustrate the presentation or rendering of the statement data (raw data or processed data). For example, the statement data may be presented by multimedia, including videos, audios, animations, or the like, or any combination thereof. As another example, the statement data may be presented using various diagrams, including histograms, column diagrams, scatter diagrams, pie charts, or the like, or any combination thereof.

Figure 2:
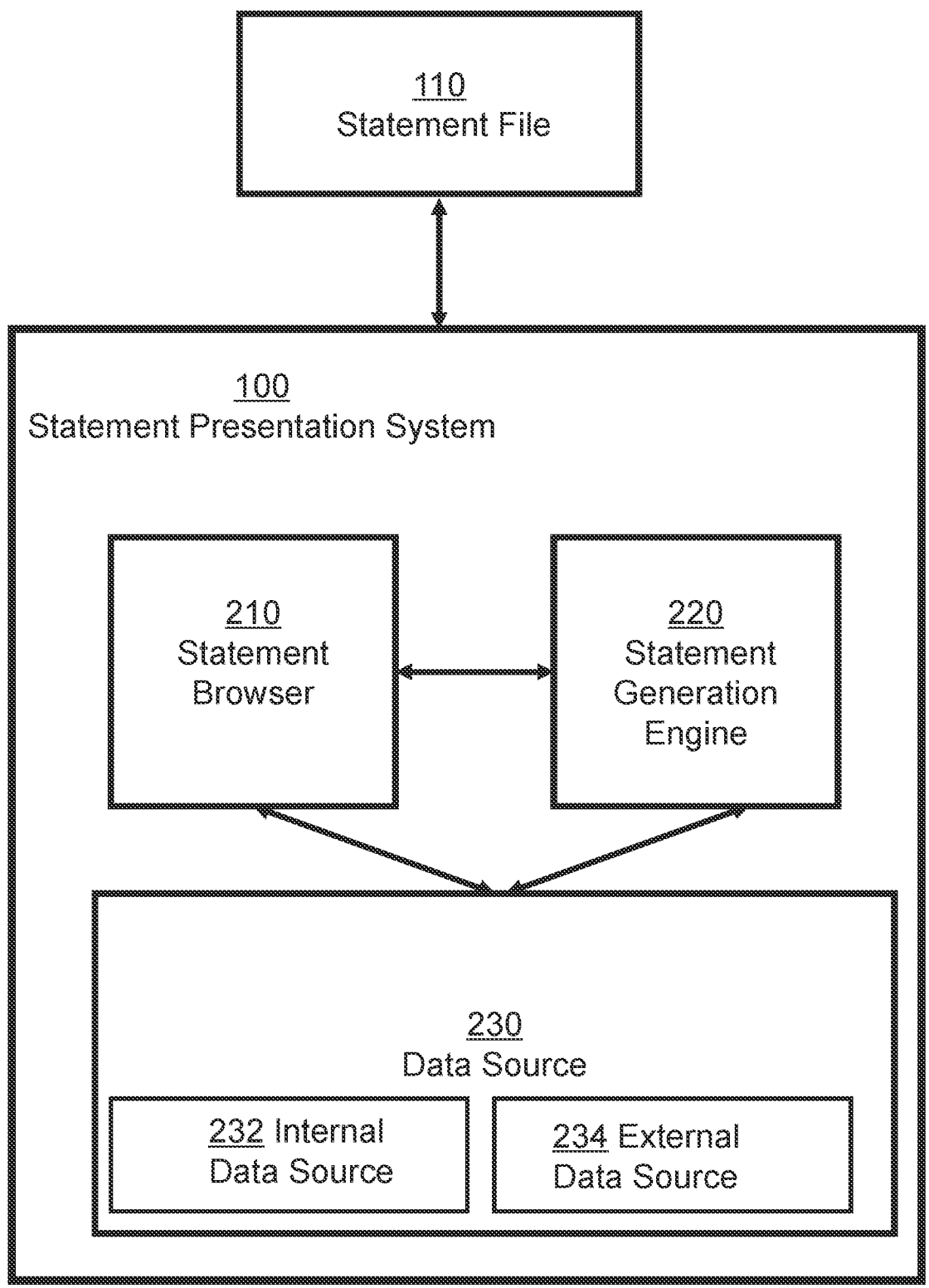
FIG. 2 is a schematic block diagram illustrating an exemplary system of statement presentation.

FIG. 2 is a schematic block diagram illustrating an example of a statement presentation system. The statement presentation system 100 may be configured to input and/or modify the statement file 110. The statement presentation system 100 may be configured to extract, process, and present the statement data. The statement presentation system 100 may include a statement browser 210, a statement generation engine 220, and a data source 230. Some or all of the above-mentioned modules may process the statement file 110. In other words, some or all of these modules may access the statement file 110, such as read and write the statement file 110. The statement file 110 may also be configured to illustrate or specify the method of accessing or processing the statement browser 210, the statement generation engine 220, or the data source 230.

"Module" of the present application refers to a kind of logic or a set of software instructions stored in hardware and firmware. The "module" referred to herein may be executed by software and/or hardware module, or be stored in any non-temporary computer-readable media or other storage devices. In some embodiments, a software module may be compiled and connected to an executable program. The module disclosed in the present disclosure may respond to the information transmitted by itself or by other modules, and/or may generate a response in response to detecting some events or interrupts. A module configured to be executable on computing equipment (such as a processor 1210 shown in FIG. 12) may be provided on a computer-readable medium (such as a storage 1230 shown in FIG. 12). The computer-readable medium may be optical disk, digital optical disk, flash disk, magnetic disk, or any other tangible media; the computer-readable medium may also obtain software module via digital download (the digital download may also include downloading data stored in RAR or installation package, the execution of which requires uncompressing or decoding beforehand). Some or all of the software codes may be stored in the storage device of the computing equipment performing operations, and be applied to the operation of the computing equipment. The software instructions may be embedded in firmware such as Erasable Programmable Read-Only Memory (EPROM). Obviously, hardware modules may include integrated logical units such as gates, triggers, and/or programmable units (like programmable gate array or processor). The functions of the above-mentioned modules or computing equipment may be preferably executed as software modules, but they may also be configured in hardware or firmware. In general conditions, the modules referred to as logic modules may not be restricted by specific physique or storage. A module may be combined with other modules, or be classified into a set of sub-modules.

The statement presentation system 100 may be integrated such as in the form a central integrated system, or distributed such as in the form of a distributed system. The distributed system may be on the local devices. For example, the modules therein such as the statement browser 210, the statement generation engine 220, and the data source 230, are local. The distributed system may also be on the remote devices. For example, one or some of the modules therein, such as the statement browser 210, the statement generation engine 220, or the data source 230, or any combination thereof, may be placed beyond a certain distance in space, and exchange information remotely. The distance may be greater than or equal to a preset threshold value. For example, the threshold value may be set as 10 kilometers or more, or 5 kilometers or more.

The statement browser 210 and the statement generation engine 220 may exchange information bidirectionally. The statement browser 210 and the data source 230 may exchange information bidirectionally. The statement generation engine 220 and the data source 230 may also exchange information bidirectionally. In some embodiments, the statement browser 210 or the statement generation engine 220 may obtain information from the statement file 110. The obtained information may include information related to the presentation method of the statement contents, information related to the data that is required to be presented in the statement contents, information related to the data source 230, etc.

In some embodiments, information related to the presentation method of the statement contents may include the drawing information of a statement interface. For example, the information may include how to draw a choice box, a dialog box, a button, a map, a calculator, or the like, or any combination thereof, of the statement interface. In some embodiments, information related to the data required to be presented in the statement contents may include data related to the statement file 110, such as various economic or financial data, or the corresponding information of time, index, or combination method related to the economic or financial data.

In some embodiments, the statement file 110 may provide information related to the data source 230. The data source 230 may include one or more databases. The data source 230 may include one or more local databases that may be referred to as an internal data source 232, and/or one or more remote databases that may be referred to as an external data source 234. The remote databases may be accessed via the Internet. In some embodiments, the statement generation engine 220 may obtain information of the data source 230 from the statement file 110. The information may include but not limited to, the data source 230's addresses, locations, interfaces, and/or data formats. And the statement generation engine 220 may obtain required data from the data source 230.

After obtaining required data by communicating with the data source 230, the statement generation engine 220, may process the obtained data. The operations of the data may be performed by a processing module 430 of the statement generation engine 220 (shown in FIG. 5). The operations may be used to extract some attributes of the data, such as time attribute, momentum attribute, and mass attribute. It should be noted that in the data processing module 430, a third-party software tool may be called for data processing. In some embodiments, the data processing module 430 may access to a third-party program such as a language and programming tool, including C, C++, Java, Matlab, Python, R, VBA, etc. These language and programming tools may provide some operations more complex than summation, average, add, subtract, multiply and divide, such as analysis of time series or analysis of frequency-domain. By providing calling interface for the third-party program, the system may conduct more flexible and convenient processing and operation of the statement data.

The statement generation engine 220 may render the processed data. Based on the information related to the presentation method of the statement contents obtained from the statement file 110, the statement generation engine 220 may draw corresponding contents for presentation in the statement browser 210. Render may refer to a presentation in the present disclosure, e.g. a presentation of data with words, charts, graphs, or the like, based on certain rules. In some embodiments, after rendering the processed data, the statement presentation system 100 may transmit the rendered data to an external device (not shown in FIG. 2) for presentation, storage or further processing. The output process may be real-time or non-real-time. The output operation may be executed directly by the statement presentation system 100 or by connected an external device.

Figure 3:
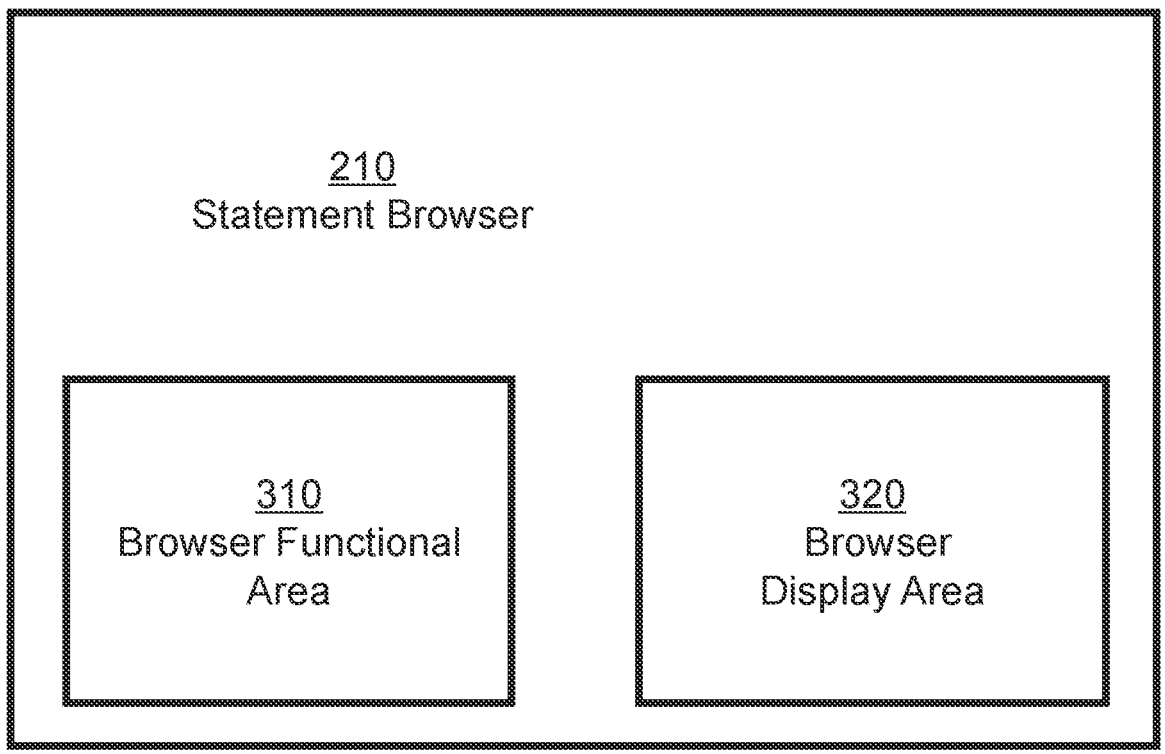
FIG. 3 is a schematic block diagram illustrating an exemplary statement browser.

FIG. 3 is a schematic block diagram illustrating an exemplary statement browser. The statement browser 210 may include a browser functional area 310 and a browser display area 320. The browser functional area 310 may provide one or more controls, including but not limited to buttons, windows, and menus for operating the browser. In some embodiments, the buttons may be used to operate pages of the browser. In some embodiments, the buttons provided by the browser functional area 310 may support operations related to viewing and analyzing economic data.

The menu provided by the browser functional area 310 may be a pull-down menu or a non-pull-down menu. In some embodiments, the menu may be hybrid, e.g. some items of the menu may be menus as well.

The window provided by the browser functional area 310 may be hierarchical, e.g. a window may include one or more sub-windows. The window may not be hierarchical. The window may be a pop-up window, e.g. the window may pop up after a corresponding button is clicked. The window may be dynamic, e.g. the windows may be dragged to other places. The window may be static, e.g. the window may remain in a fixed place of the screen. The window may display text and multimedia files including videos, animations, audios, etc.

Based on a predefined format, the browser display area 320 may define how the windows may be placed and superimposed together in the location required by the layout file. In some embodiments, the upper part of the browser may be designated as the browser functional area 310, and the lower part of the browser may be designated as the browser display area 320. The setting of the browser display area 320 may vary with different economic data. Obviously, those skilled in the art, after understanding the basic principles of the statement presentation method and system, may modify or vary the form and details of the statement browser 210 without departing from the principles. The modifications and variations are still within the scope of the current disclosure described above.

Figure 4:
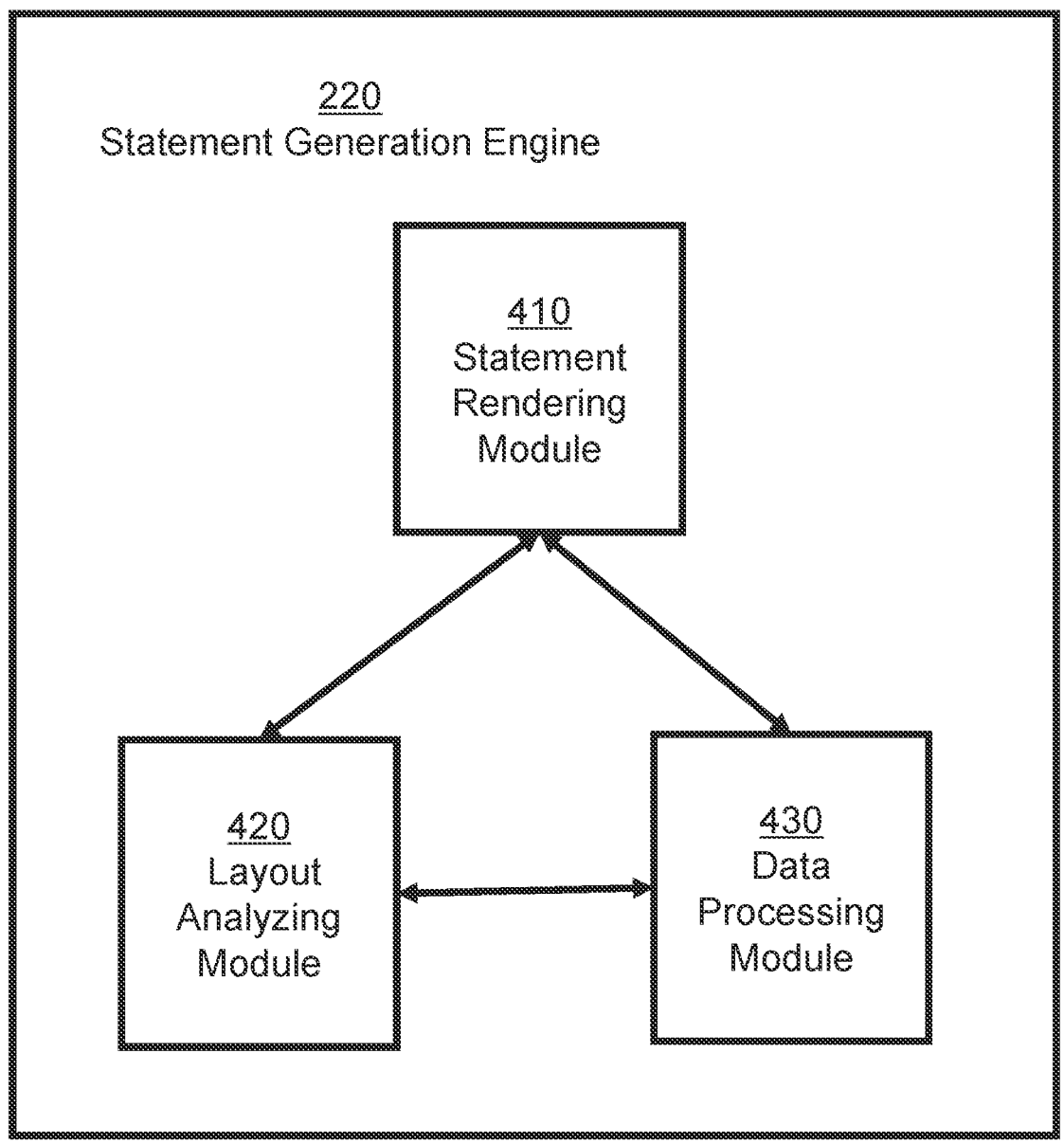
FIG. 4 is a schematic block diagram illustrating an exemplary statement generation engine.

FIG. 4 is a schematic block diagram illustrating an exemplary statement generation engine. The statement generation engine 220 may include a statement rendering module 410, a layout analyzing module 420, a data processing module 430, etc. The statement rendering module 410 may be configured to present statement contents, draw a statement interface, and/or present data related to the statement file 110 according to the disclosure of the layout file. For example, the statement rendering module 410 may draw windows of the browser functional area 310 and the browser display area 320. In some embodiments, the statement rendering module 410 may draw a function bar, a scroll bar, a menu, or the like, or any combination thereof, of the window. In some embodiments, the statement rendering module 410 may define the settings of some buttons, such as the location, length, width, or character size of the buttons.

The layout analyzing module 420 may be configured to analyze the layout file, and to verify the locations of each control as well as the related data formats. The controls mentioned above may include frames, buttons, menus, windows, dialog boxes, or the like, or any combination thereof. The related data formats may include Boolean values, floating point numbers, strings, arrays, sets, lists, records, tables, or the like, or any combination thereof. The data formats may be self-defined (e.g. program-defined or user-defined). For example, a user may define the data format of an object. The object may refer to a data set containing computer-recognizable and executable codes and ASCII characters. As another example, if a menu item with a size of 500×300 pixels is set by the layout file to be placed on the top of the browser functional area 310, the layout analyzing module 420 may analyze relevant descriptions of the layout file, and a layout rendering module may then draw it in the corresponding place of a presentation interface.

The data processing module 430 may support data extraction and processing. In some embodiments, the data processing module 430 may extract contents related to data extraction and processing from the layout file. In some embodiments, the layout analyzing module 420 may transmit some or all of the contents of the layout file to the data processing module 430. In some other embodiments, the statement rendering module 410 may transmit some or all of the contents of the layout file to the data processing module 430, and the data processing module 430 may then extract contents related to the data extraction and processing therefrom.

Obviously, those skilled in the art, after understanding the basic principles of the information required for calling interface of the third-party program, may modify or vary the contents of the required information without departing from the principles. The modifications and variations are still within the scope of the current disclosure described above. For example, in some embodiments, the output data of the calling interface of the third-party program may be transmitted directly to the data processing module 430 for processing.

Figure 5:
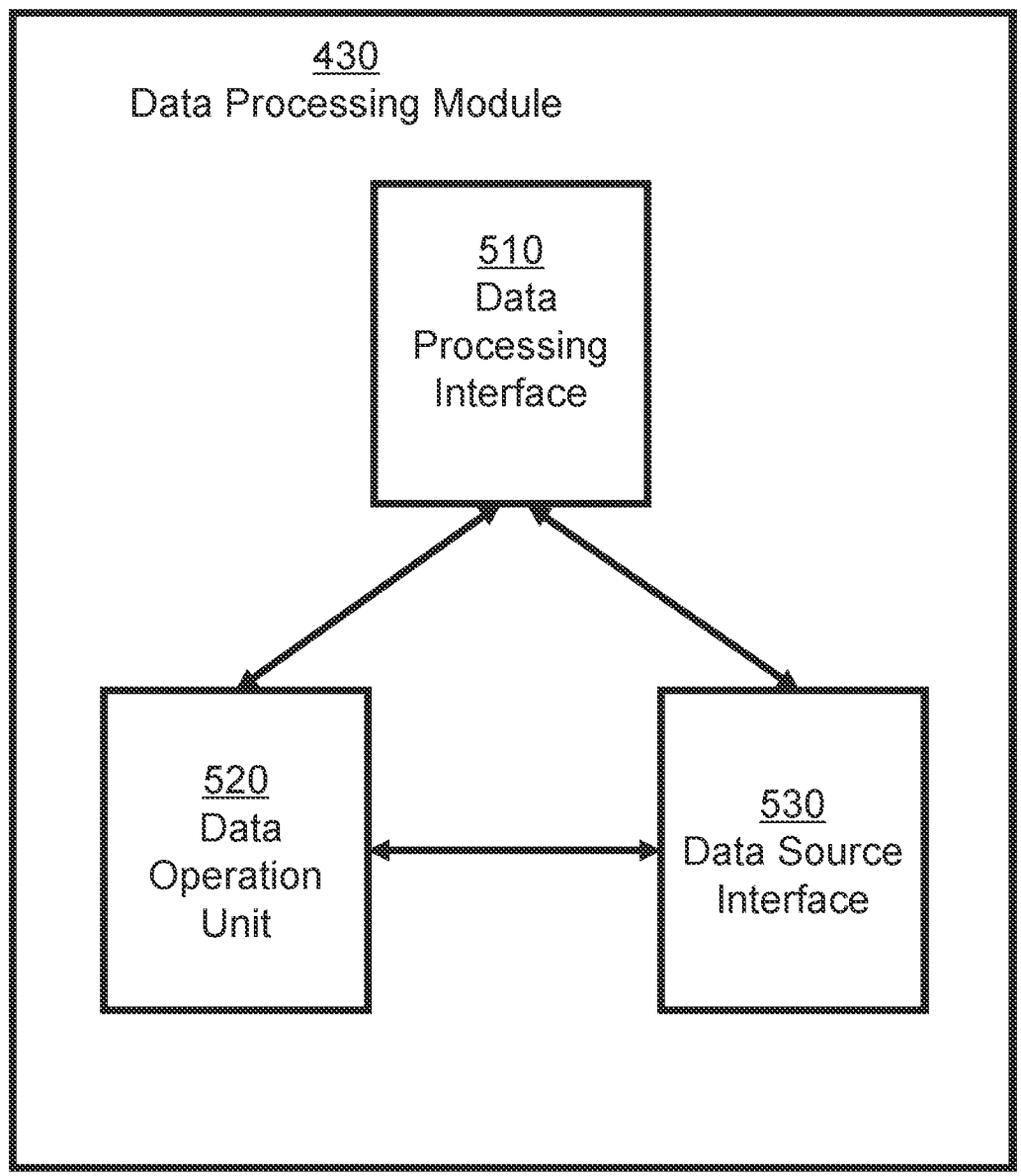
FIG. 5 is a schematic block diagram illustrating an exemplary data processing module.

FIG. 5 is a schematic block diagram illustrating an exemplary data processing module. The data processing module 430 may include a data processing interface 510, a data operation unit 520, and a data source interface 530. The data processing interface 510 may pre-process data transmitted by the statement rendering module 410 and/or the layout analyzing module 420. In some embodiments, the data processing interface 510 may analyze the type of the data source 230 that is required by the data. For example, the data processing interface 510 may determine that the type of the data source 230 required by the data is an external data source, and then transmit the data to an external data source interface of the data source interface 530 (not shown in FIG. 5). As another example, the data processing interface 510 may determine that the type of the data source 230 required by the data is an internal data source, and then transmit the data to an internal data source interface of the data source interface 530 (not shown in FIG. 5). In some embodiments, the data processing interface 510 may determine the type of the software tool that is required by the data. For example, the data processing interface 510 may determine that the software tool required for data processing is C++, and then transmit data to the data operation unit 520 for a corresponding processing. A detailed description of the processing procedure is provided below.

The data source interface 530 may provide an interface function for various data sources 230. The data sources 230 may be classified into internal data sources and external data sources. The internal data sources may include local database management systems (DBMS) and local storage mediums. The external data sources may include a data source 230 obtained via a network, such as a data source 230 obtained via Wide Area Network (WAN), or a data source 230 obtained via the Internet.

In some embodiments, the data source interfaces 530 of data processing module 430 may support a data extraction. The data source interfaces 530 may be classified into internal data source interfaces (not shown in FIG. 5) and external data source interfaces (not shown in FIG. 5). The data processing module 430 may determine the type of interface by analyzing the property of the data source 230 required to be extracted. For example, if the data source 230 is an internal data source, the data processing module 430 may then call an internal data source interface to create a data connection pool, and transmit instructions and statements related to data extraction to the internal data source interface. As another example, if the locator of the data source 230 is a network address or a network database pointed to by the Uniform Resource Locator (URL), then the data processing module 430 may call an external data source interface to create a data connection pool, and transmit instructions and statements related to data extraction to the external data source interface. In some embodiments, instructions and statements of the data extraction may be SQL statements. In other embodiments, when the database for data extraction is XML database or the like, instructions and statements of the data extraction may be XML statements. The internal data source interface may execute the instructions of data extraction that are stored in the connected database source, and return the result to the data processing module 430.

The internal data source interface and the external data source interface may be implemented by hardware or software. For example, the internal data source interface may be written in a particular programming language. In some embodiments, the internal data source interface may be written in C++ language. In some embodiments, the internal data source interface may be written in XML. For example, the internal data source interface may be generated by inserting LUA Program Block in XML. The external data source interface may include an external database interface. In some embodiments, if the external data source is an external database source, the data processing module 430 may call the external database interface of the data source interface 530 to create the data connection pool, and transmit the instructions and statements of the data extraction to the external database interface. In some embodiments, the instructions and statements of the data extraction may be SQL statements. In some embodiments, when the database for data extraction is XML database or the like, instructions and statements of the data extraction may be XML statements. The external database interface of the data source interface 530 may execute the instructions of data extraction that are stored in the connected database source, and return the result to the data processing module 430.

In some embodiments, the external data source interface of the data source interface 530 may include network data interface. In some embodiments, if the data source 230 is an external data source, such as a network data source, the data processing module 430 may call the network data interface (not shown in FIG. 5), and transmit required contents and format to the network data interface. Based on the received requirement for contents and format, the network data interface may obtain corresponding data from the network and return the result to the data processing module 430. In some embodiments, the network data interface may be implemented by a program written in Python. For example, the network data interface may set the crawling depth and breadth through the program in Python. For example, the network data interface may set crawling rules through the program in Python. In some embodiments, these crawling rules may be written in the layout file generated by a program in XML. In other embodiments, the network data interface may set crawling object, crawling site, crawling mode, or the like, or any combination thereof. In some embodiments, the network data interface may be implemented by a program in JavaScript.

The data operation unit 520 may provide functions of data operation and processing. The data may be extracted from the layout file, or from the data source 230 via the data source interface 530. The quantum operations on indexes may be implemented by setting application program interface (API) in the data operation unit 520, and loading specific operation code, compiled operation library, operation tool (e.g. C, C++, JAVA, MATLAB, Python, R, VBA, LUA, etc.), or the like, or any combination thereof.

In some embodiments, the data processing module 430 may call the data operation unit 520 (see descriptions related to FIG. 5 in the present application) to support an operation of the extracted data. It should be noted that the various embodiments of the present disclosure support direct or third-party processing of the various data extracted from the statements. For example, the various embodiments of the present disclosure may include accessing a third-party program such as a language and programming tool, including C, C++, Java, MATLAB, Python, R, VBA, etc. By providing an interface for calling the third-party program, the system may conduct more flexible and convenient processing and operation of the statement data. In some embodiments, the data operation unit 520 may load a specific operation code, a compiled operation database, or a compiled operation tool (C, C++, JAVA, MATLAB, Python, R, VBA, LUA, etc.), or the like, or any combination thereof. The data operation unit 520 may transmit required data to the operation code, the operation database, or the operation tool, and generate a result after the operation.

Figure 6:
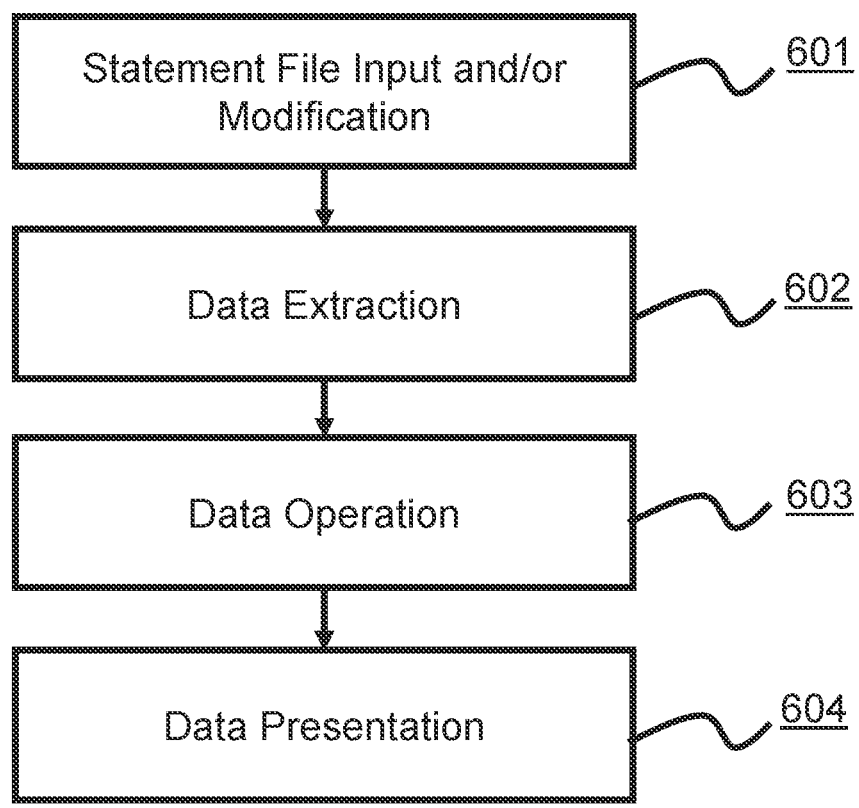
FIG. 6 is a flowchart illustrating an exemplary operation of the statement presentation system.

FIG. 6 is a flowchart illustrating an exemplary operation of the statement presentation system. In step 601, a statement file 110 may be obtained from a server via a network or from a local device. The obtained statement file 110 may be transmitted to the statement presentation system 100. A module of the statement presentation system 100, such as the statement generation engine 220, may obtain required information from the statement file 110. The information may be obtained directly (e.g., by reading the statement presentation system 100 via wired or wireless connections). The information may also be obtained indirectly. For example, the information may be obtained through a third-party medium.

In some embodiments, the statement presentation system 100 may include a layout file. The layout file may describe ways of obtaining data and/or presenting statement. The layout file may be stored in one statement file or stored separately in multiple statement files. The layout file may be created by an operator manually, or created in a certain computer language. For example, the layout file is a program file in a certain computer language. In some embodiments, the layout file may be written in a markup language. For example, the layout file may be written in extensible markup languages (XML). Other kinds of computer languages may be embedded in the layout file written in XML in order to call the interface of a third-party program, or to call a library file programed by a third-party program. In some embodiments, some fragments of a script language may be embedded in the layout file written in XML. For example, some fragments in LUA script language may be embedded in the layout file written in XML. For persons having ordinary skills in the art, various variations and modifications may be conducted under the teaching of the present disclosure. However, those variations and modifications may not depart from the spirit and scope of this disclosure. For example, the layout file may be a text file satisfying certain grammar rules and formats that can be recognized by both humans and machines. In such case, a user, such as a programmer, may easily create or modify the layout file. In addition, the data in a statement may be easily extracted, processed and presented by setting specific rules and grammar of programing language.

In some embodiments, the statement file 110 can be modified by the statement presentation system 100 in this step. The modification process may be completed by an operator manually. For example, such modification may be completed by a user. In some embodiments, the user may modify the statement file 110 through the statement browser 210. The modification process may be completed by the system automatically. For example, the statement presentation system 100 may automatically add a required data source to the entered statement file 110 for data search. This embodiment may be applied in the case of adding some default data or some sources of default database in the statement file 110. As another example, the statement presentation system 100 may automatically add a corresponding API to the entered statement file 110 in order to employ a certain operation tool (e.g. via the API) to operate the data.

In some embodiments, the data source of the statement file 110 can be modified. For example, a user may modify the data source of the statement file 110 by modifying a particular website. As another example, the user may modify the data source of the statement file 110 by modifying a particular database. In some embodiments, the layout file may be used to modify the data source. For example, the setting of the layout file may be changed to modify the data source. In some embodiments, the method of data processing of the statement file 110 can be modified. For example, the user may use an operation tool, such as C++, to operate the data by loading a corresponding API.

In step 602, the data of the layout file may be extracted by some modules of the statement presentation system 100, such as the statement generation engine 220. In some embodiments, the extracted data may be obtained from the layout file and/or the data source 230. This extraction may be executed based on the illustration with respect to the extracted data in the statement file 110. In some embodiments, the layout file in the statement file 110 may be used to illustrate or specify the data extracting method in the statement. For example, the layout file may illustrate or specify the source of data by specifying the data source 230. One or more databases may be included in the data source 230. In some embodiments, the data source 230 may be stored at the local device, which referred to as an internal data source 232. The data source 230 may also be accessed via a network, which referred to as an external data source 234. In some embodiments, links to the internal data source 232 or the external data source 234 may be added in the layout file written in XML. The layout file can support the data source 230 that is provided by a program or defined by a user. For example, in a program provided to users, methods of connections to the date source (database or network data) of the program provider may be included. This data source may be referred to as a data source provided by a program. Methods of connections to the data source may be described by the user in the layout file. This data source may be referred to as the data source defined by a user. In some other embodiments, the layout file may support user for obtaining specific data in a specific website from the Internet.

The data extracted by statement generation engine 220 from the statement file 110 may be used to illustrate the statement presentation method. In some embodiments, some of these data may be related to the statement presentation method. For example, one or more attributes of various controls, such as the size and placement of buttons, menus, windows, and the like, in the statement may be specific. In some embodiments, some of these data may be required to be presented, such as some economic and financial data. In some embodiments, some of these data may configure to instruct the data source 230. In some embodiments, some of the data may configure to instruct an operation code, an operation library file or an operation tool loading on demand (C, C++, JAVA, MATLAB, Python, R, VBA, LUA, or the like, or any combination thereof).

In step 603, the data extracted from the layout file and/or the data source 230 may be operated and processed. The data may be operated and processed either manually by an operator or automatically by the system. The operation of data may be completed by the user. For example, the user may operate the data through calling a loadable operation code, an operation library, or an operation tool. The operation of data may be completed automatically by the system. For example, some economic or financial indicators defined in the layout file may be operated by an assigned formula or an operation tool. In some embodiments, the process of operating and processing data involved in step 603 may be implemented by process 900 shown in FIG. 9. The process of operating and processing data may be executed by the data operation unit 520. The function of operation and processing may be implemented by the calculation functional block of the data operation unit 520. In some embodiments, the function of operation and processing may be implemented by setting API in the data operation unit 520, and loading specific operation code, or compiled operation library, or operation tool (C, C++, JAVA, MATLAB, Python, R, VBA, LUA, etc.), or the like, or any combination thereof.

In step 604, the operated and processed data may be presented in the statement browser 210. In some embodiments, the statement presentation involved in step 604 may be implemented by process 1000 shown in FIG. 10. The data may be presented in different sub-windows set in the window. This presentation may be static. In other words, the sub-windows may not change its position during the presentation. This presentation may also be dynamic. In other words, the sub-windows may change its position during presentation. The data may be presented by multimedia which may be combined with one or more different contents forms, such as videos, audios, animations and the like. The data may be presented by one or more graphics methods, such as histograms, scattergrams, pie charts, line graphs, block diagrams, and the like. The presented data may be exported into different formats for subsequent processing. For example, the presented data may be saved as an Excel file, a Word file, and a Portable Document Format (PDF) file.

Figure 12:
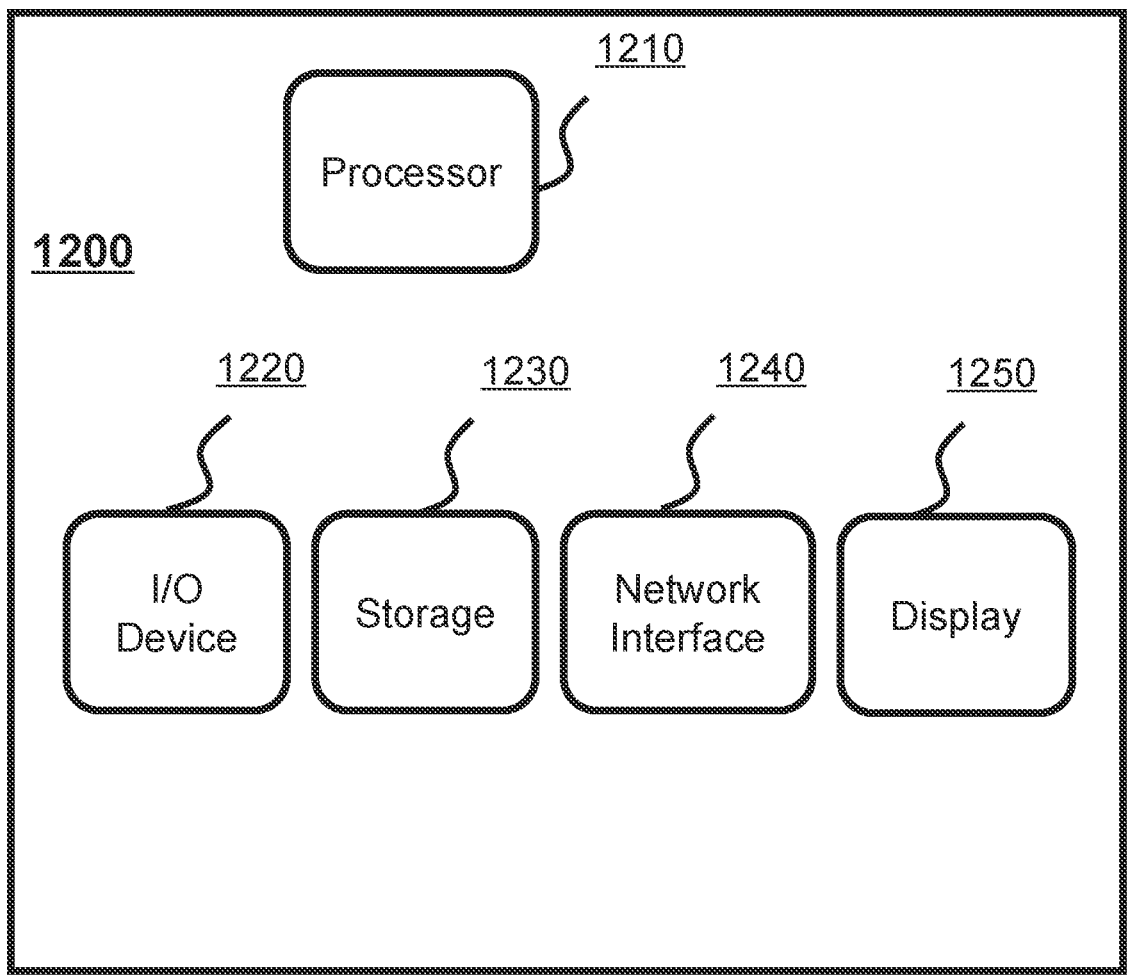
FIG. 12 is an exemplary structure diagram of a statement presentation system.

In some embodiments, the statement presentation system 100 may render the processed data, and then present, store or further process the data in an external device (such as the display 1250 in FIG. 12). The external device may be a local device or a mobile terminal device, such as a desktop computer, a laptop computer, a mobile phone, a tablet and the like, and it may also be a remote server or a cloud server, etc. The output data may be presented on an electronic display, such as a LED (Light Emitting Diode) display and a LCD (Liquid Crystal Display) display, or a touch screen, such as a resistive touch screen, a capacitive touch screens, a plasma touch screen, a vector pressure sensor touch screen, an infrared touch screen and the like. In particular, the types of display devices may include but is not limited to computers, mobile phones, tablets, electronic watches and the like. The types of the output signal may include a digital signal, a waveform signal, an analog waveform signal, a symbolic signal, a code signal, a speech signal, a video signal, an image signal, and the like. The output process may be a real-time process or a non-real-time process. The output process may be performed directly by the statement presentation system 100, or by a connected external device.

Figure 7:
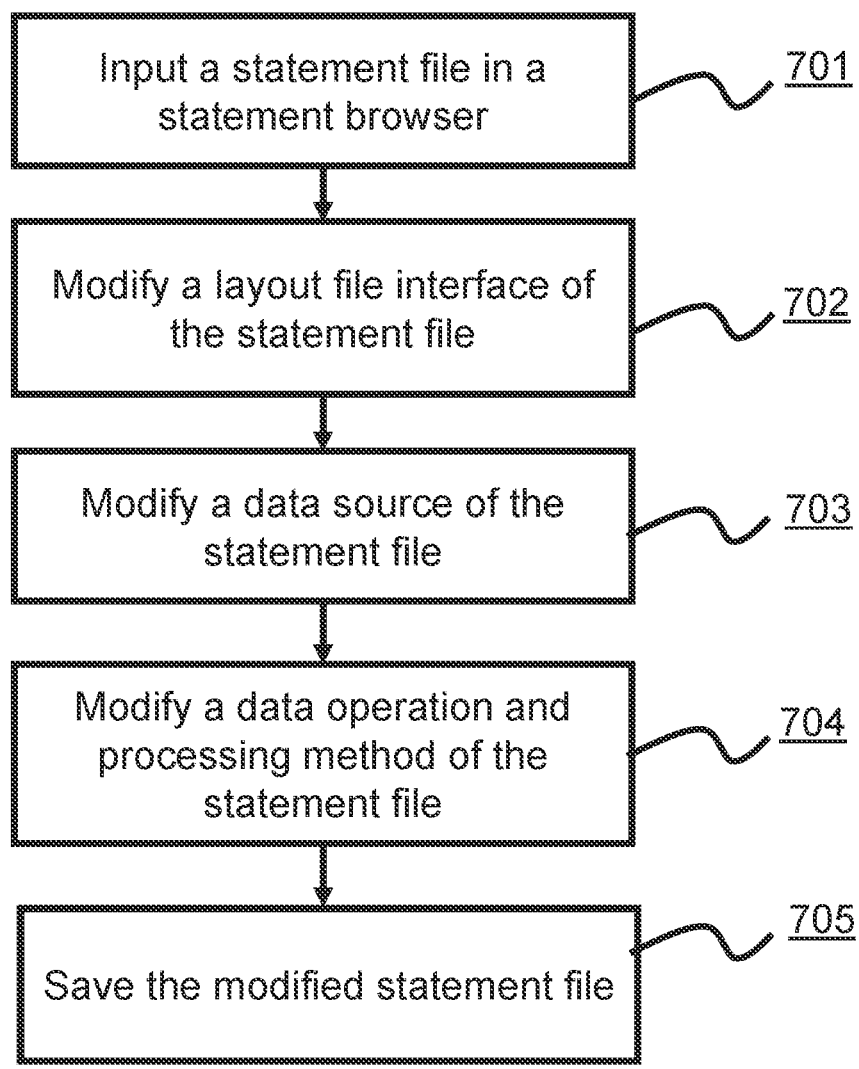
FIG. 7 is a flowchart illustrating an exemplary process of statement file modification by a statement presentation system.

In some embodiments, the step 601 of the process 600 may be implemented by the method of modifying statement file 700 shown in FIG. 7. In step 701, the statement file 110 may be transmitted to the statement browser 210. In some embodiments, the user may set the source code display window of the statement file 110 through the statement browser 210. For example, one or more function buttons may be set in the browser ribbon 310 of the statement browser. Through clicking these function buttons, one or more windows may be popped up as the source code display window of the statement file 110. These function buttons may be configured to launch the functions of compiling, debugging and/or editing the source code. In some embodiments, the statement file 110 may be written in XML. The statement file 110 written in XML may include script language, such as LUA language.

In step 702, the interface settings of data presentation described by the layout file in the statement file 110 may be modified. The modification process may be completed manually. In some embodiments, the user may modify the interface through setting various controls, such as buttons, menus, and windows. In some embodiments, the presentation mode of various graphs may be modified. For example, the horizontal and vertical axes of a histogram may be exchanged. As another example, a histogram may be changed to a scatter plot. The modification process may be completed by the system automatically. In some embodiments, the interface settings of data presentation described by the layout file may be modified by the background program of the statement browser 210. For example, the interface settings of data presentation described in the layout file may be modified to a predefined present mode by the background program of the statement browser 210. As another example, the interface settings of data presentation described by the layout file may be automatically modified by the system to an appropriate display method depending on various types of the display screens (such as mobile phone screens, computer screens, TV screens, outdoor display screens, and so on).

In step 703, the data source 230 of the statement file 110 can be modified. The modification process may be completed by an operator manually. In some embodiments, a user may modify the data source 230 on the source code window for modifying the layout file on the statement browser 210. For example, the user may change a local data source 230 to a remote data source. As another example, user may add a local data source. The modification process may be completed by the system automatically. In some embodiments, the data source 230 may be automatically adjusted by a specific crawler in the statement generation engine 220. The data source 230 meeting particular set conditions (may set by some modules of the statement file 110, such as the statement generation engine 220, or may set manually) may be identified by the crawler through network. Then the identified data source 230 may be added into the layout file by a crawler or other programs.

In step 704, the method of data operation and processing of the statement file 110 may be modified. The modification process may be completed by an operator manually. In some embodiments, a user may modify the method of data operation and processing on the source code window for modifying the layout file on the statement browser 210. The modification process may be completed automatically. For example, the third-party operation tool (such as C, C++, Java, MATLAB, Python, R, VBA, LUA, or the like, or any combination thereof) may be called to modify the way of data processing.

In step 705, the modified statement file 110 may be sorted in a storage area of the statement file 110 (e.g. the storage 1230 in FIG. 12). The stored statement file 110 may be processed further. For example, the statement file 110 may be transmitted to the statement generation engine 220 for further processing, such as extracting and processing data.

Figure 8:
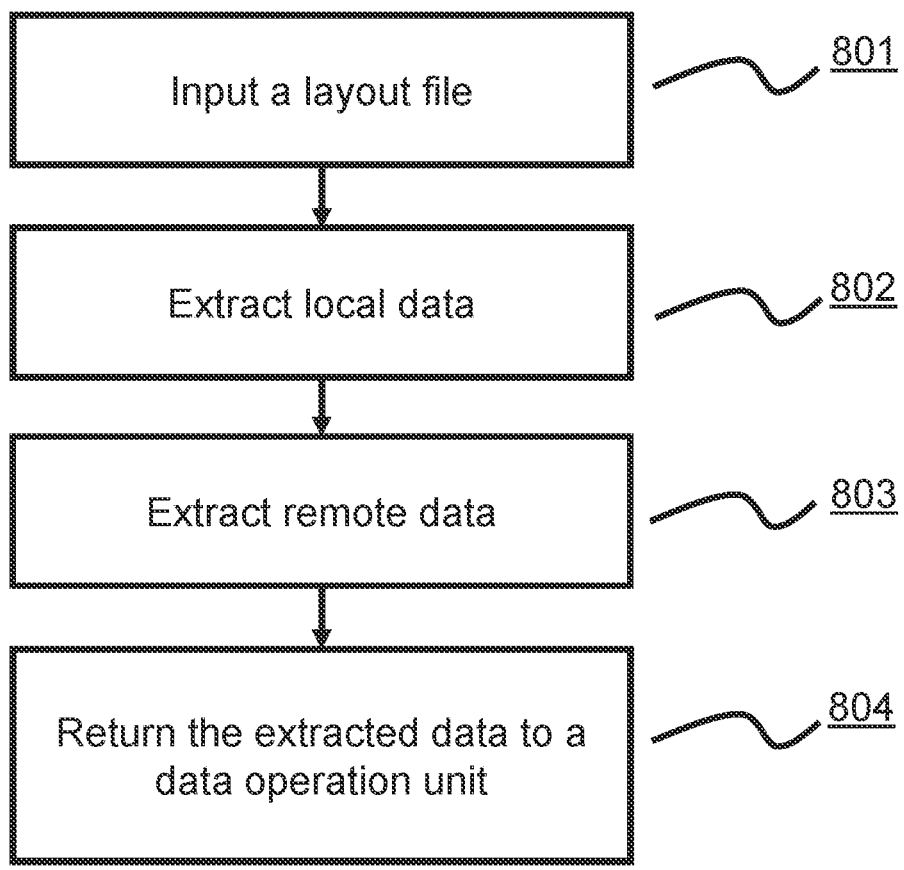
FIG. 8 is a flowchart illustrating an exemplary process of data extraction by a statement presentation system.

Referring back to FIG. 6, in some embodiments, the step 602 of method 600 may be implemented by the data extraction data 800 in FIG. 8. In step 801, the layout file may be transmitted to some modules of the statement presentation system 100, such as the statement generation engine 220. In some embodiments, the statement browser 210 or the statement generation engine 220 of the statement presentation system 100 may extract information from the layout file. The extracted information may include the information of the presentation method of the statement contents, the information of the data required to be presented in the statement contents (e.g. may include the information of economic or financial data etc.) and/or the information related to the data source 230 etc.

In some embodiments, the information of the presentation method of the statement contents extracted from the statement file 110 may include the drawing information of the statement interface. For example, the information may include how to draw one or more of the basic modules in the statement interface, such as choice boxes, dialog boxes, buttons, maps, calculations, or the like, or any combination thereof. As another example, the information of the presentation method of the statement contents may include the information of how to draw one or more windows in the statement interface. The window may be a pull-down window or a pop-up window. In some embodiments, the window may present various types of multimedia data such as videos, audios, animations and the like. In some embodiments, the window may present various diagrams, such as column diagrams, histograms, scatter diagrams, pie charts, or the like, or any combination thereof.

In some embodiments, the information of the data required to be presented in the statement contents which may extracted from the statement file 110 may include the data related to the statement file 110. These data may include various economic data including stocks, bonds, futures, options, funds, financial managements, foreign exchanges, indexes, macro industries, news, research reports, quotes, property transactions, financial strategies, tools, and the like (FIG. 11 may show an embodiment of the interface of presenting the above economic data). The data of the stock may include one or more kinds of data, such as the belonging exchanges of stock, markets of stock, regions of stock, industries of stock, recommended securities companies, concepts of stock, indicators of stock, and indexes component of stock, or the like, or any combination thereof. The exchange of stock may include one or more stock exchanges, such as the Shanghai and Shenzhen stock exchange, the Hong Kong stock exchange, the US stock exchange, the UK stock exchange, the German stock exchange, or the like, or any combination thereof. The market of stock may include one or more markets of the Shanghai A Market, the Shanghai B Market, the Shenzhen A Market, the Shenzhen B Market, the Small and Medium-sized Enterprises Board and the Growth Enterprises Board, or the like, or any combination thereof. The region of stock may include one or more of Northeast, North, East, South, Central, Northwest, Southwest of China mainland, Hong Kong, Macao and Taiwan, or the like, or any combination thereof. The industry of stock may include one or more of agriculture, forestry, animal husbandry, fishery, mining, manufacture, electronic, gas and water production and supply, construction, transportation, warehousing, information technology, wholesale and retail trade, finance and insurance, Real estate, social services, communication and cultural industries, or the like, or any combination thereof. The recommended securities company may include one or more of CITIC Securities, Galaxy Securities, Western Securities, Southwest Securities, Shenyin Wanguo Securities, Huatai Securities, or the like, or any combination thereof. The concept of the stock may include one or more of the Concept Of Alibaba, Security, Liquor, Security Room, Equity Financing, Equity Participation of Private Banks, Equity Securities Company, Equity New Shares, Shares of The New Board, Glyphosate, Superconductivity, Super Capacitor, Internet of Vehicle, Charging Pile, Touch Screen, Venture Capital, Large Aircraft, Big Data, Disney, Underground Pipe Network, Electric Reform, Electronic Invoice, E-Sports, E-Commerce, Electronic Information, ASEAN Free Trade Area, Second Child Concept, Two-Dimensional Code Recognition, Disperse Dyes, Wind Electricity, Fluorine Chemical, Fujian Free Trade Area, High-End Equipment, High-Transfer, High-Speed Rail, Colleges And Universities, Industry 4.0, Supply Chain Finance, Solid Waste Treatment, PV Concept, Guangdong Free Trade Area, Domestic Software, Marine Equipment, The Asian Games in Hangzhou, Shipping, Nuclear Power, Internet+, The Internet lottery, or the like, or any combination thereof. The indicators of stock may include one or more of MACD (Moving Average Convergence Divergence), Volume Ratio Index, Buying and Selling Pressure, KDJFS, RSIFS, BOLLFS, Time-sharing, or the like, or any combination thereof. Any of the combination may include an algebraic or functional operation on one or more of the indicators. The algebraic operations may include addition, subtraction, multiplication, division, and any multiple but limited combinations of these four operations. The functional operation may include a situation in which one or more of the indicators as variables to operate with currently known functions. The known functions may include exponential functions, logarithmic functions, trigonometric functions, inverse trigonometric functions, polynomial functions, rational functions, and the like. Equity holdings may include one or more of the funds, Qualified Foreign Institutional Investors (QFII), insurances, brokerages, trusts, annuities, social securities, banks, financial investment companies, or the like, or any combination thereof.

In some embodiments, the information related to the data source 230 extracted from the statement file 110 may be the information related to the type, address, location, interface, and/or data format of the data source. For example, the data source 230 may be a database. The data source 230 may be stored at a local device, referred to as the internal data source 230. The data source 230 may be accessed via a network, referred to as the external data source 230. In some embodiments, links to the internal or external data source 230 may be added into the layout file written by XML. The internal data source 230 may include a local database management system (DBMS) and a local storage medium. The local database management system may include MySQL, PostgreSQL, Microsoft SQL Server, Oracle, Sybase, SAP HANA, and DB2 produced by the International Business Machines Corporation (IBM) and the like. The local storage medium may be a device that stores information by magnetic energy, including a hard disk, a floppy disk, a tape, a magnetic core memory, a magnetic bubble memory, and the like. The local storage medium may be a device that stores information by optics, such as a CD, a DVD, or other storage devices. The local storage medium may be a device that stores information by electric energy, including a read-only memory (ROM), a random access memory (RAM), a flash memory, a U disk, etc. The external data source 230 may include the data source 230 obtained via a network, such a wide area network (WAN), or the Internet. In some embodiments, a user may obtain the data source 230 from the Internet through obtaining corresponding data on a specific website. Some database managing systems which may transmit and process data through network may also be included in the external data source 230. For example, an XML database may be one of the data source 230, which may include MarkLogic, Oracle Berkeley DB XML Database, Clusterpoint Distributed XML/JSON Database and the like. In some embodiments, the statement generation engine 220 may extract the information related to the address, position, port, and/or format of the data source 230 from the statement file 110, and may communicate with the data source 230 to obtain its required data.

In step 802, the statement presentation system 100 can extract the local data. The local data may include data stored in the database management system (DBMS), or on the local storage medium. The database management system may include MySQL, PostgreSQL, Microsoft SQL Server, Oracle, Sybase, SAP HANA and DB2 produced by the International Business Machines Corporation (IBM) and the like. The local storage medium may be a device that stores information by magnetic energy, including a hard disk, a floppy disk, a tape, a magnetic core memory, a magnetic bubble memory, and the like. The local storage medium may be a device that stores information by optics, such as a CD, a DVD, or other storage devices. The local storage medium may be a device that stores information by electric energy, including the read-only memory (ROM), random access memory (RAM), flash memory, U disk, etc.

In step 803, the statement presentation system 100 may extract the remote data. The remote data may include the data stored in the external data source 230. The external data source 230 may include the data source 230 obtained via a network, such a wide area network (WAN), or the Internet. Some database managing systems may also be included in the external data source, such as XML databases, which may include MarkLogic, Oracle Berkeley DB XML Database, Clusterpoint Distributed XML/JSON Database and the like.

In some embodiments, if the data source 230 is the external data source 234, such as the data on a network, the data processing module 430 may call an interface of network data (not show in FIG. 11), and transmit required contents and format to the interface of network data. The interface of network data may be an underline section of the interface of the external data source. According to the coming requirement of contents and format, the interface of network data may obtain corresponding data via the network, and may return the results back to the interface of the external data source. Then the external data source may return the data to the data processing module 430. In some embodiments, the interface of network data may be implemented through the program in Python, and may set width and/or depth of the crawling, and crawling rules using the program in Python. In some embodiments, the crawling rules may be written in the layout file in XML. In some other embodiments, the interface of network data may set one or more of objects, sites and models of crawling, or the like, or any combination thereof. In some embodiments, the interface of network data may be implemented by a program in JavaScript.

In step 804, the local data and/or remote data extracted by the modules (such as the layout analyzing module 420) of the statement presentation system 100, may be transmitted to the data operation unit 520. The data operation unit 520 may process the extracted local data and/or remote data accordingly. Obviously, those skilled in the art, after understanding the basic principles of the data extraction, may modify or vary the form and details of application fields of the method and system without departing from the principles. The modifications and variations are still in the scope of the current disclosure described above.

Figure 9:
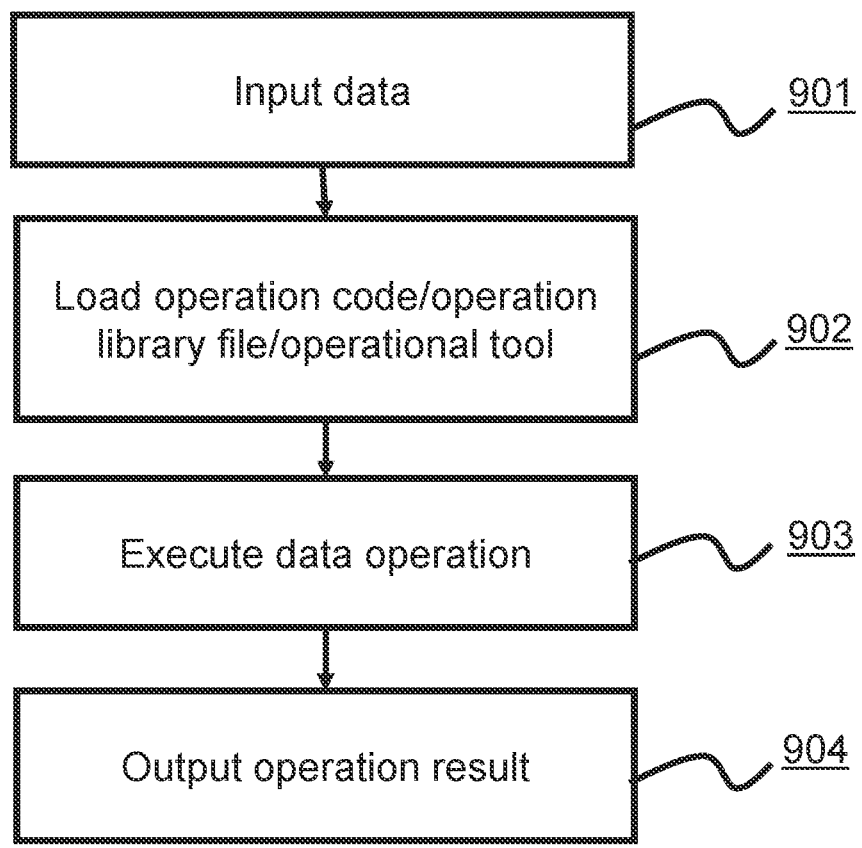
FIG. 9 is a flowchart illustrating an exemplary process of data operation and processing by a statement generation engine.

Referring back to FIG. 6, in some embodiments, the step 603 of the method 600 may be implemented by the data operation and processing method 900 shown in FIG. 9. In step 901, the data may be transmitted to the data operation unit 520 by the statement generation engine 200. In step 902, the data operation unit 520 may conduct various operations of the data. These operations may include sampling analysis, grid analysis, feature point extraction, regression analysis, Gauss process regression analysis, variance analysis, mean value analysis, cluster analysis, linear discriminant analysis, multi-linear principal component analysis, factor analysis, discriminant analysis, contrastive analysis, simulation analysis, simulated analysis, threshold value method, Gaussian function decomposition method, Wavelet transform, Fourier transform, Chebyshev polynomials fitting, HTT method, quadratic discriminant analysis, maximum entropy classifier, decision tree, decision table, kernel estimation, k-nearest method, Naïve Bayes classifier, neural network, visual controller, gene expression programming, Markov random field, Kalman filter, particle filter, independent component analysis, principal component analysis, conditional random field, Hidden Markov Model, Maximum Entropy Markov Model, recurrent neural network, association rules, inductive logic programming, similarity measurement learning, deep neural network, deep belief network, convolution neural network, convolution deep belief network, or the like, or any combination thereof. The data operation unit 520 may calculate or process the received data. The data operation unit 520 may also calculate or process the data which has undergone feature analysis. The calculation methods may include minimum-maximum standardization, Z-score standardization, standardization based on decimal calibration, linear function method, logarithmic function method, arc cotangent function method, norm method, history threshold value iteration method, modeling method, least square method, elimination method, order reduction method, substitution method, image method, comparison method, adding and deducting method, vector method, induction method, proof by contradiction, method of exhaustion, method of completing the square, method of undetermined coefficients, method of substitution, factorization, term-adding method, factor method, parallel translation method, functional approximation method, interpolation method, curve-fitting method, integral method, differential method, perturbation method, or the like, or any combination thereof. The data operation unit 520 may process the received data according to time series, e.g., if the received data vary with the change of time, the data operation unit 520 may modulate the received data. The modulation contents may include amplitude, phase, frequency, intensity, or the like, or any combination thereof. The modulation methods may include angle modulation, phase modulation, frequency modulation, amplitude modulation, double-sideband modulation, single-sideband modulation, vestigial sideband modulation, amplitude deviation modulation, phase deviation modulation, quadrature amplitude modulation, frequency deviation modulation, continuous phase modulation, orthogonal frequency division multiplexing, pulse code modulation, pulse width modulation, pulse amplitude modulation, pulse location modulation, pulse density modulation, trigonometric integral modulation, or the like, or any combination thereof. Accordingly, the data operation unit 520 may demodulate the received data to find the original data before modulation. It should be noted that the data processing module 430 may call a third-party software to process the data. For example, the data processing module 430 may access to a third-party program such as a language and programming tool, including C, C++, Java, MATLAB, Python, R, VBA, etc. These language and programming tools may provide some operations and processing more complex than summation, average, add, subtract, multiply and divide, such as some data processing methods mentioned above. By providing calling interface of third-party program, the system may conduct more flexible and convenient processing and operation of the statement data. For example, the data operation unit 520 may load an operation code, an operation library file, or an operation tool. The operation code may be a local operation code, such as a local executable code. The operation code may be a remote operation code, such an operation code called from the Internet. In some embodiments, the data operation unit 520 may set API to load a specific operation code, such as the operation code obtained by compiling C, C++, Java, VBA, Python, R, and MATLAB.

In some embodiments, Python, an operation tool, may be loaded to operate and process the data. The following is an example of Python code:

For example: extract data of closing price, change, volume of December 16 on the platform of ROYALFLUSH every 15 minutes

```
>>> from iFinDPy import *
>>> iFinD.FT_iFinDLogin("THS37000333,""ifinder") \\
    log in
```

```
>>>High=iFinD.FTQuerySyn_HighFrequenceSequence
    ('300033.SZ','close;volume;chg','CPS:0,Maxpoint:
    50000,Fill:Previous,Interval:15','2015-01-01  09:15:
    00','2015-01-20 15:15:00') \\ request data
>>>High.get('tables')[0].get('thscode') \\ obtain code
>>>High.get('tables')[0].get('time') \\ obtain time
>>>High.get('tables')[0].get('table').get('volume')  \\
    obtain volume
>>>High.get('tables')[0].get('table').get('close')  \\
    obtain closing price
>>>High.get('tables')[0].get('table').get('chg') \\ obtain
    change
```

Obviously, those skilled in the art, after understanding the basic principles of the information required for calling interface of the third-party program, may modify or vary the contents of the required information without departing from the principles. The modifications and variations are still within the scope of the current disclosure described above. For example, in some embodiments, the output data of the calling interface of the third-party program may be transmitted directly to the data processing module 430 for processing.

In step 903, the data operation unit 520 may operate and process the input data, and generate a result after operation and processing. In step 904, the operation and processing result is outputted.

Figure 10:
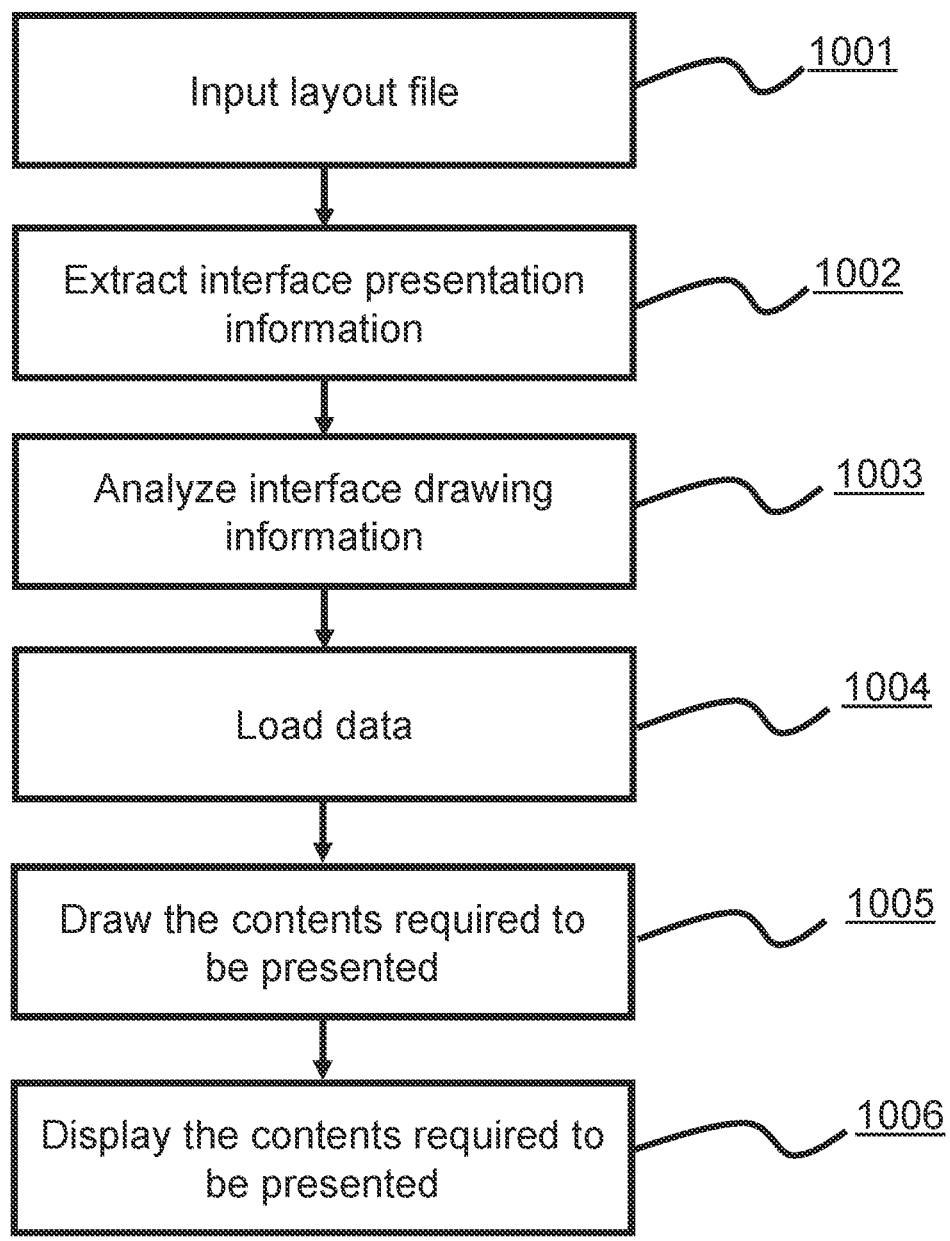
FIG. 10 is a flowchart illustrating an exemplary process of statement presentation by a statement generation engine.

Referring back to FIG. 6, the step 604 of the method 600 may be implemented by a sample data presentation method 1000 presented in the FIG. 10. In step 1001, the layout file may be transmitted to some modules of the statement presentation system 100, such as the statement generation engine 220. In step 1002, the information related to interface presentation may be extracted from the layout file by some modules of the statement generation engine 220, for example by the statement rendering module 410. The information may include information related to various specific buttons, menus, windows in the layout file, or information related to the setting of various dialog boxes and edit boxes.

In step 1003, the information of interface drawing may be analyzed by the statement presentation system 100. "Analyze" herein may be understood as interpreting the interface drawing method according to the method set by the programing language (such as JavaScript) used in the statement presentation system. In some embodiments, the relevant contents of configuration presented in the analysis interface of the statement presentation system 100 may define the drawing contents of the user interface (UI). The contents may include location, size, and color of various controls (such as buttons, menus, and windows), headlines and pictures being presented, etc. In some embodiments, the browser functional area 310 may draw one or more controls (such as buttons, menus, and windows) which serve for processing the statement browser 210. In some embodiments, the button may be used to operate the pages of the browser. For example, the button may be used to operate a particular display area. The operations may include scrolling up, scrolling down, backing, forwarding, reloading, playing back, re-skinning, and recovering configuration, or the like, or any combination thereof. In some embodiments, the buttons provided by the browser functional area 310 may support operations related to the browse and analysis of economic data (such as stocks, bonds, futures, share options, funds, financial managements, indexes, foreign exchanges, business, research reports, market quotations, transactions, strategies, operation tools). For example, regarding stocks, the operation buttons provided may include data presentation buttons, computational analysis buttons, and operation and modification buttons. In some embodiments, the data presentation buttons provided may include "Shanghai and Shenzhen Statement," "Hong Kong Stocks Statement," "American Stock Statement," "Broker Business," "Non-listed Company," "Stock Market Calendar," "Data Browser," "Depth Data," etc. In some embodiments, the computational analysis buttons provided may include "Index Calculation," "Data Verification," "Evaluator Model," "Beta Calculator," "WACC Calculator," "DMM Calculator," etc. In some embodiments, the operation and modification buttons provided may include, "Modify Parameter," "Save Template," "Add New Table," "Export Excel," etc. For example, regarding bonds, the operation buttons provided may include data presentation buttons, computational analysis buttons, and operation and modification buttons. In some embodiments, the data presentation buttons provided may include "Bond Consultation," "Bond Bulletin," "Bond Research Report," "Quote Platform," "Monetary Market," "Bond Calendar," "Data Browser," "Depth Data," etc. In some embodiments, the computational analysis buttons provided may include "Index Calculation," "Data Verification," "Pledge-style Repo Analysis," "Buyout-purchase Analysis," "Dissemble Analysis," "Holding Period Income Analysis," etc. In some embodiments, the operation and modification buttons may include, "Modify Parameter," "Save Template," "Add New Table," "Export Excel," etc. For example, regarding operation tools, the operation buttons provided may include common tool buttons, mouse gesture tools, and personal service buttons. In some embodiments, the common tool buttons may include "Start Excel," "Start Word," "Start Calculator," "Start Notepad," "Repair Excel Addin," "Template Convert," "Repair WPS Addin," "PDF Convert," etc. In some embodiments, the mouse gesture buttons provided may include "Start Mouse Gesture". In some embodiments, the personal service buttons provided may include "Model Center," "Data Customization," "Data Reminder," "Data Interface," "Quantized Transaction," etc.

In some embodiments, the menu provided by the browser functional area 310 may be a pull-down menu or a non-pull-down menu. In some embodiments, the menu may be hybrid, e.g. some items of the menu may be menus as well. The window provided by the browser functional area 310 may be placed in a convenient position for a viewer. In some embodiments, the window may be placed on the top of the browser. In some embodiments, the window may be placed on the left part of the browser. In some embodiments, the window may be placed on the top and the left part of the browser at the same time. The window may be hierarchical, e.g. a window may include one or more sub-windows. The window may not be hierarchical. The window may be a pop-up window, e.g. the window may pop up after a corresponding button is clicked. The window may be dynamic, e.g. the windows may be dragged to other places. The window may be static, e.g. the window may remain in a fixed place of the screen. The window may display text and multimedia files including videos, animations, audios, etc.

Based on the predefined format, the browser display area 320 may define how the windows may be placed and superimposed together in the location required by the layout file. In some embodiments, the upper part of the browser may be configured as the browser functional area 310 and the lower part of the browser may be configured as the browser display area 320. The setting of the browser display area 320 may vary with different economic data. For example, regarding stocks, the browser display area 320 may display the real-time trend of the stocks on the center part, and display the real-time data of the stocks (such as closing quotation of yesterday, opening quotation of today, ceiling price, bottom price, quantity relative ratio, total stock, amount of money, etc.) on the right part. The browser display area 320 may display the overall performance of the stocks (such as constituent stock, time-sharing quantum, market consultation, fund flow, increase position size in stock, short-time change, popular stock of the board, or the like, or any combination thereof) on the lower part of the display area. Obviously, those skilled in the art, after understanding the basic contents and principles of the present application, may modify or vary the form and details of the statement browser 210 without departing from the principles. The modifications and variations are still within the scope of the current disclosure described above. For example, the browser display area 320 may include a separate part for video display. This part may be configured to display real-time or non-real-time economic data analysis of some third-party financial website or media. Similarly, the browser functional area 310 may reserve button to mark the API with any third-party program, such as MATLAB program calling interface, C++ interface, R language interface, VBA interface, Python interface, etc.

In step 1004, some modules of the statement presentation system 100, such as the statement rendering module 410, may load the data that is required to be presented. The data may include the data required to be presented by the original layout file, and the data calculated and processed by data processing module after accessing the data source 230. In step 1005, some modules of the statement presentation system 100, such as the statement rendering module 410 may draw the data required to be presented on window canvas. In step 1006, some modules of the statement presentation system 100, such as the layout analyzing module 420, may present the statement drew by the statement rendering module 410. The presentation may be performed on particular presentation platforms, such as mobile phone screens, computer screens, TV screens, and exterior wall screens. The presentation may be operated manually or automatically. Obviously, those skilled in the art, after understanding the basic principles of the data presentation method and system, may modify or vary the form and details of application fields of the method without departing from the principles. The modifications and variations are still within the scope of the current disclosure described above.

Figure 11:
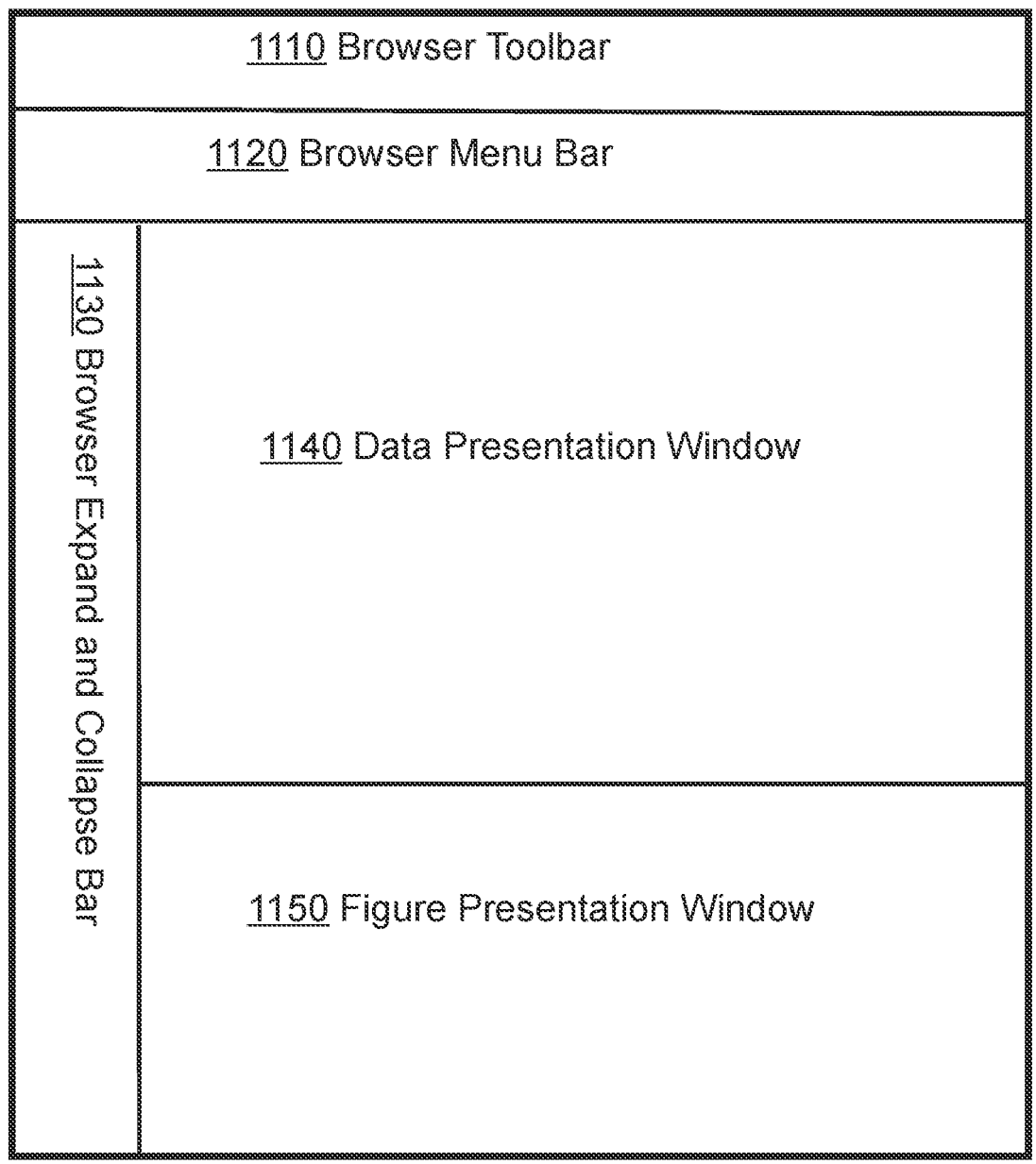
FIG. 11 is an exemplary statement diagram presented by a statement presentation system.

FIG. 11 is an exemplary statement diagram presented by the statement presentation system according to some embodiments. The upper part of the FIG. 11 may be a browser toolbar 1110. The browser toolbar 1110 may present various buttons assisting the browser operation such as backing, forwarding, reloading, importing history record, calculating, etc. A browser menu bar 1120 may be configured below the browser toolbar 1110. The browser menu bar 1120 may provide various menus and buttons. The menu may be a pull-down menu or a non-pull-down menu. The button may be configured to direct to different sub-classified statements of economic or financial data such as Shanghai and Shenzhen statement, equity exchange statement, Hong Kong stocks statement, etc. The left side of the FIG. 11 may be a browser expand and collapse bar 1130. The expand and collapse bar 1130 may be configured to provide various data catalogues directed by the menus/buttons of the browser menu bar 1120. For example, when the Shanghai and Shenzhen Statement is clicked, the browser menu bar 1120 may present different data catalogues like market size, basic information, back up data, etc. A data catalogue may contain multiple sub-catalogues. For example, sub-catalogues such as listed stock overview, basic information of listed companies, and scale ranking of listed companies, may be configured under the catalogue of basic information. The bottom right corner of the FIG. 11 may include a data presentation window which may be classified into various sub-windows. In some embodiments, the data presentation window may be classified into a data presentation window 1140 and a figure presentation window 1150. The data presentation window 1140 may present various data types of the statement such as tables and lists. The figure presentation window 1150 may present various diagrams of the statement such as histograms, scatter diagrams, and pie charts. The various controls presented in FIG. 11 such as buttons, menus, and windows, may be defined and changed in the layout file. In some embodiments, the button "Calculator" of the browser toolbar 1110 may supply API which may be configured to load specific operation code. For example, the operation code/library file/calculator tools obtained by compiling C, C++, Java, VBA, Python, R, MATLAB programming, may operate and process the data obtained via different data sources 230.

FIG. 12 is an exemplary structure diagram illustrating the statement presentation system 100 according to some embodiments. The statement presentation system 100 may include a processor 1210, an I/O device 1220, one or more storages 1230, one or more network interfaces 1240, and one or more displays 1250. Some or all of the above mentioned devices may be connected to a network (not shown in FIG. 12). The devices may be centralized or distributed, local or remote.

The processor 1210 may control the operation of the statement presentation system 100 through computer program instructions. The computer program instructions may be stored in one or more storages 1230. One or more of the processors 1210 may include but not limited to microcontrollers, reduced instruction set computers (RISC), application-specific integrated circuits (ASIC), application specific instruction processors (ASIP), central processing units (CPU), graphics processing units (GPU), physics processing units (PPU), microprocessor units, digital signal processors (DSP), filed-programmable gate arrays (FPGA), or other circuits or processors that may execute computer program instructions, or any combination thereof.

The I/O device 1220 may implement the interaction between an information source and the statement file 110. The information source herein may be the statement file 110 or a user. In some embodiments, the I/O device 1220 may collect information from an information source via a network. In some embodiments, the I/O device 1220 may transmit information to an information source through a network 120. In some embodiments, the I/O device 1220 may transmit information to the statement presentation system 100 by one or more of the following ways, including keyboard inputs, touch screen inputs, mouse inputs, camera, scanner, writing pad inputs, voice inputs, or the like, or any combination thereof. In some embodiments, the I/O device 1220 may output information by a display, a printer, a loudspeaker, or the like, or any combination thereof. The output forms may include but not limited to numbers, characters, images, audios, videos, or the like, or any combination thereof.

The storage 1230 may be configured to store various information, such as computer program instructions and data of the statement presentation system 100. One or more storages 1230 may be devices that store information by electric energy such as various memories, random access memory (RAM), read only memory (ROM), etc. The RAMs may include but not limited to dekatron, selectron, delay line memory, Williams tube, dynamic random access memory (DRAM), static random access memory (SRAM), thyristor random access memory (T-RAM), zero-capacity random access memory (Z-RAM), or the like, or any combination thereof. ROMs may include but not limited to magnetic bubble memory, magnetic button wire memory, film memory, magnetic plated wire memory, magnetic core memory, magnetic drum memory, CD-ROM drive, hard disk, tape, non-volatile random access memory (NVRAM), phase change memory, magnetoresistive random access memory, ferroelectric random access memory, non-volatile SRAM, flash memory, electrically erasable rewritable read only memory, erasable programmable read only memory, programmable read only memory, mask read only memory, relocatable linking gate random access memory, nanometer random access memory, racetrack memory, variable resistance memory, programmable metallization unit, or the like, or any combination thereof. One or more storages 1230 may be devices that store information by magnetic energy, such as hard disk, floppy disk, magnetic tape, magnetic core memory, magnetic bubble memory, USB flash disk, flash memory, etc. One or more storages 1230 may be devices that store information by optics, such as CD, DVD, etc. One or more storages 1230 may be devices that stores information by magneto-optics such as magneto-optical disk, etc. The storage methods of one or more storages 1230 may be random storage, serial access storage, read only storage, or any combination thereof. One or more storages 1230 may be non-permanent storage device or permanent storage device. Above are only some examples of the storage 1230, other applicable storages 1230 may also be used in the statement presentation system 100. One or more storages 1230 may be local storages, remote storages, or storages based on cloud server.

A network interface 1240 may be configured to implement the communication between some or all of the devices of the statement presentation system 100 and a user or the statement file 110 by network. In some embodiments, the network interface 1240 may be configured to implement the communication among some or all of the devices of the statement presentation system 100. The network interface 1240 may be wired network interface or wireless network interface. The network interfaces 1240 may include but not limited to metal cable, optical fiber, hybrid cable, junction circuit, or other wired network interface, or any combination thereof. The network interfaces 1240 may include but not limited to a Wireless Local Area Network (WLAN) interface, a Local Area Network (LAN) interface, a Wide Area Network (WAN) interface, a Bluetooth connection, a Zigbee interface, a Near Field Communication (NFC) interface, or the like, or any combination thereof.

It should be noted that the steps, operation processes, and functions of various modules or units described in the present disclosure are illustrative only. Some steps, modules, or units may be omitted when applicable. Similarly, the various features grouped in certain embodiments are intended to aid the demonstration, expression, description and illustration, and shall not be interpreted that the subject matter requires all features expressly recited in the disclosure. For those skilled in the art, some steps, modules, or units may be added, deleted, repeated, or reused based on different requirements.

In closing, it should be understood that is the present disclosure of constructions and configurations in the exemplary embodiments is intended to be presented by way of example only and is not limiting. Though not expressly stated herein, various alterations may occur and are intended to those skilled in the art based on different requirements. Furthermore, the present disclosure includes the various constructions and configurations described herein and any other novel and non-obvious combinations or sub-combinations of features, functions, and/or attributes.

I claim:

1. A statement presentation system, comprising:
    a computer-readable storage medium configured to store executable modules, comprising:
        a statement browser configured to receive a statement file and present a statement; and
        a statement generation engine configured to:
            modify the statement file, wherein the modification of the statement file includes modifying interface setting, data source, and method of data operation and processing of the statement file are completed by the system automatically, and the modification of the data source includes automatically adjusting the data source through a specific crawler;
            generate a modified statement file;
            extract data from a data source based on the modified statement file;
            operate the extracted data;
            render the operated data; and
            display the rendered data on the statement browser in the form of a statement.

2. The system of claim 1, wherein the statement file is in a language format of XML.

3. The system of claim 2, wherein the statement file comprises an LUA language script.

4. The system of claim 1, wherein the modified statement file is modified by editing the source code of the statement file.

5. The system of claim 1, wherein the modified statement file comprises at least one of modifications to an interface of a layout file in the statement file, an address of a data source in the statement file, and a data operation formula of the statement file.

6. The system of claim 1, wherein the operation of the extracted data is conducted by loadable operation code, a loadable operation library file, or a loadable operation tool.

7. The system of claim 1, wherein the extraction of data comprises extracting local data, the local data comprises data of a local database or data of a user-defined database.

8. The system of claim 1, wherein the extraction of data comprises extracting remote data, the remote data comprises data obtained from a network.

9. The system of claim 8, wherein the data obtained from the network comprises data obtained from a webpage.

10. An online statement presentation method, comprising:
    receiving a statement file;
    modifying the statement file and generating a modified statement file, wherein the modification of the statement file includes modifying interface setting, data source, and method of data operation and processing of the statement file are completed by the system automatically, and the modification of the data source includes automatically adjusting the data source through a specific crawler;
    extracting data from a data source based on the modified statement file;
    operating the extracted data;
    rendering the operated data; and
    displaying the rendered data in the form of a statement.

11. The method of claim 10, wherein the statement file is in a language format of XML.

12. The method of claim 11, wherein the statement file comprises an LUA language script.

13. The method of claim 10, wherein the modified statement file is modified by editing the source code of the statement file.

14. The method of claim 10, wherein the modified statement file comprises at least one of modifications to an interface of a layout file in the statement file, an address of a data source in the statement file, and a data operation formula of the statement file.

15. The method of claim 10, wherein the operation of the extracted data is conducted by loadable operation code, a loadable operation library file, or a loadable operation tool.

16. The method of claim 10, wherein the extraction of data comprises extracting local data, the local data comprises data of a local database or data of a user-defined database.

17. The method of claim 10, wherein the extraction of data comprises extracting remote data, the remote data comprises data obtained from a network.

18. The method of claim 17, wherein the data obtained from the network comprises data obtained from a webpage.

19. A non-transitory computer readable medium comprising a set of instructions, wherein when executed by at least one processor, cause the at least one processor to effect a method comprising:
  receiving a statement file;
  modifying the statement file and generating a modified statement file, wherein the modification of the statement file includes modifying interface setting, data source, and method of data operation and processing of the statement file are completed by the system automatically, and the modification of the data source includes automatically adjusting the data source through a specific crawler;
  extracting data from a data source based on the modified statement file;
  operating the extracted data;
  rendering the operated data; and
  displaying the rendered data in the form of a statement.

* * * * *